(12) United States Patent
Ohashi

(10) Patent No.: US 6,881,086 B2
(45) Date of Patent: Apr. 19, 2005

(54) CARD CONNECTOR

(75) Inventor: Chie Ohashi, Kawasaki (JP)

(73) Assignee: Tyco Electronics AMP K.K., Kanagawa (JP)

( * ) Notice: Subject to any disclaimer, the term of this patent is extended or adjusted under 35 U.S.C. 154(b) by 0 days.

(21) Appl. No.: 10/319,043

(22) Filed: Dec. 12, 2002

(65) Prior Publication Data

US 2003/0109178 A1 Jun. 12, 2003

(30) Foreign Application Priority Data

Dec. 12, 2001 (JP) ........................................ 2001-378602

(51) Int. Cl.[7] .............................................. H01R 13/62
(52) U.S. Cl. ....................................... 439/326; 439/630
(58) Field of Search ................................ 439/326, 325, 439/327, 630, 159, 862, 629, 331; 361/737

(56) References Cited

U.S. PATENT DOCUMENTS

| | | | |
|---|---|---|---|
| 5,226,826 A | * | 7/1993 | Nillson et al. ................ 439/72 |
| 5,603,629 A | * | 2/1997 | DeFrasne et al. ........... 439/331 |
| 5,911,587 A | * | 6/1999 | Vermeersch ................ 439/188 |
| 5,984,707 A | * | 11/1999 | Kuwata ....................... 439/326 |
| 6,024,593 A | | 2/2000 | Hyland ........................ 439/326 |
| 6,099,337 A | * | 8/2000 | Chan ........................... 439/326 |
| 6,106,317 A | * | 8/2000 | Michaelis et al. .......... 439/326 |
| 6,210,193 B1 | * | 4/2001 | Ito et al. ..................... 439/326 |
| 6,227,893 B1 | | 5/2001 | Kaneko ....................... 439/326 |

FOREIGN PATENT DOCUMENTS

| | | | |
|---|---|---|---|
| EP | 0905827 A2 | 3/1999 | .......... H01R/23/72 |
| EP | 0965937 A1 | 12/1999 | .......... G06K/7/00 |
| JP | 11-161742 | 6/1999 | .......... G06K/13/06 |

* cited by examiner

*Primary Examiner*—Alex Gilman
(74) *Attorney, Agent, or Firm*—Barley Snyder LLC

(57) ABSTRACT

A card connector has a housing with contacts. A cover is mounted to the housing and has a card insertion slot that receives a card. The card has a contact portion corresponding to the contacts of the housing. A locking member locks the cover to the housing. The locking member is slideably mounted on the housing and has a cam surface that engages an end of the card. The locking member pushes the card adjacent to the contacts so that the contact portion slides across the contacts of the housing to wipe contaminants from a surface of the contact portion and the contacts to improve an electrical connection there between.

16 Claims, 5 Drawing Sheets

CARD CONNECTOR

BACKGROUND OF THE INVENTION

The invention relates to a card connector. More specifically, the invention relates to a card connector that wipes contaminents from contact points of a card and contacts of a card connector before electrical engagement.

DESCRIPTION OF THE PRIOR ART

Card connectors used for recording mediums, such as IC (integrated circuit) cards and Subscriber Identity Module (SIM) cards of portable terminals, are commonly known. One example of such a card connector is disclosed in U.S. Pat. No. 6,227,893. The card connector has a base, a cover rotatably attached to the base, and a lock bar for engaging the cover when the cover is pressed down. The lock bar is pivotally supported on the base so as to be rotatable. A card is inserted into the cover and electrical connections are established between external terminals of the card and contacts provided on the base when the lock bar engages the cover.

Another example of a card connector or guide for an IC card is disclosed in Japanese Unexamined Patent Publication Number 11(1999)-161742. The card connector has a cover for housing an IC card and a base for rotatably supporting the cover. Electrical connections are established between external terminals of the IC card and contacts provided on the base by rotating the cover towards the base. A card lock for locking the IC card and a cover lock for locking the cover to the base are slidably provided on the base to ensure a positive engagement between the external terminals and the contacts.

In the existing card connectors, the cover is engaged with the base by means of the lock bar so that the external terminals of the card and the contacts are connected. The external terminals are simply pressed and/or locked onto the contacts such that the contact positions of the external terminals and the contacts do not change. Because no wiping occurs between the external terminals and the contacts, if a thin film of contaminants is formed on the external terminals and/or contacts, there is a possibility of a faulty electrical connection between the external terminals and the contacts.

It is therefore desirable to develop a card connector that establishes optimal electrical connections between external terminals of a card and contacts housed in the connector.

SUMMARY OF THE INVENTION

The invention relates to a card connector having a housing provided with contacts. A cover has a card insertion slot that receives a card. The card has a contact portion corresponding to the contacts of the housing. A locking member locks the cover to said housing. The locking member engages an end of the card and pushes the card adjacent to the contacts so that the contact portion slides across the contacts of said housing and is electricaily connected thereto.

The invention further relates to a method of removing contaminents from contact points in a card connector. A card having contact portions is inserted into a cover. The cover is rotated to engage a surface of a locking member so that the locking member moves away from the cover so that the cover engages a housing. The locking member locks the cover to the housing and pushes the card adjacent to contacts in the housing so that the contact portion slides across the contacts to wipe any contaminents therefrom.

BRIEF DESCRIPTION OF THE DRAWINGS

FIG. 5 is a partial magnified view of a locking operation of a cover.

DETAILED DESCRIPTION OF THE PREFERRED EMBODIMENT

Figure 1:
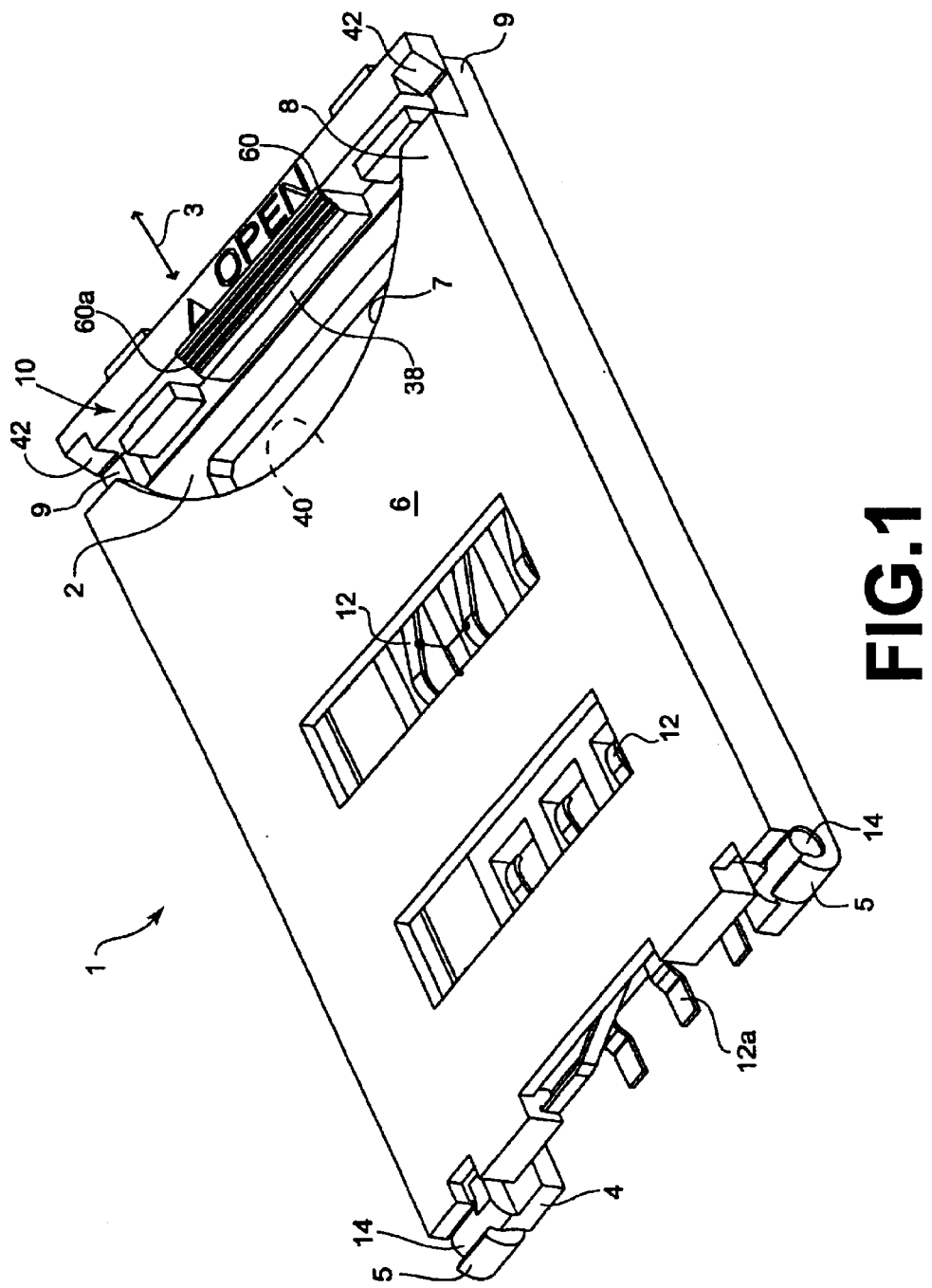
FIG. 1 is a perspective view of a connector according to a first embodiment of the present invention.
Figure 3:
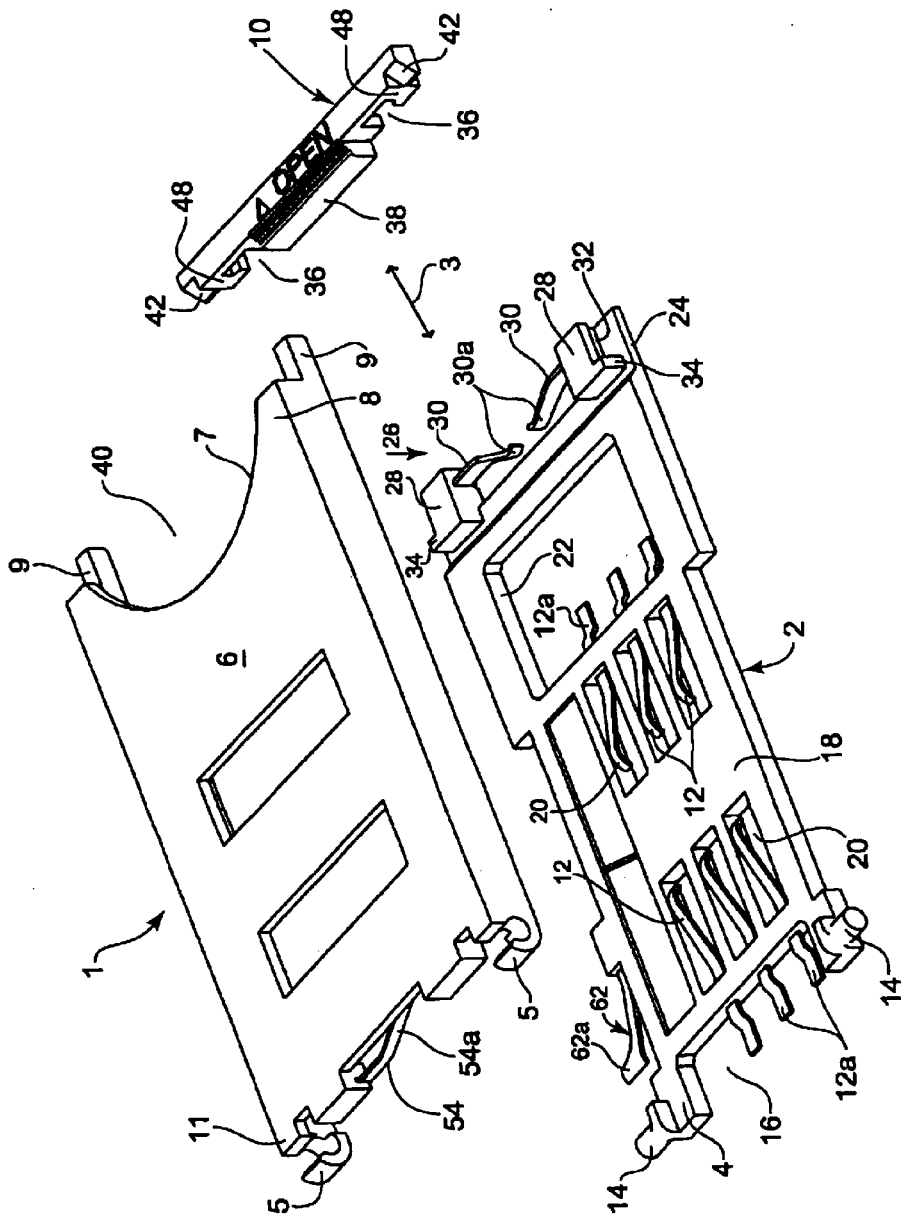
FIG. 3 is an exploded perspective view of the connector of FIG. 1.

FIGS. 1 and 3 show a first embodiment of a card connector 1 according to the present invention. As shown in FIG. 1, the connector 1 comprises a housing 2 and a cover 6. The housing 2 has a substantially rectangular base and is attached to a circuit board (not shown). The cover 6 is rotatably attached to the housing 2 and pivots between an open position (not shown) and a closed position (shown in FIG. 1). The cover 6 has a card insertion slot 40 for receipt of a card 70 (shown in FIG. 5), such as a Subscriber Identity Module (SIM) card. A lock bar 10 locks the cover 6 in a closed position so that external terminals (not shown) of the card 70 electrically contact a plurality of contacts 12 in the housing 2. The housing 2 and the cover 6 may be formed of a resin.

As shown in FIG. 1, the housing 2 is provided with the contacts 12. The contacts 12 are formed from a metal having elasticity. As shown in FIG. 3, six openings 20 are formed on a main surface 18 of the housing 2 and extend in a lengthwise direction of the housing 2. The contacts 12 are insert molded to the housing 2 so that contact portions 12b of the contacts 12 project from the openings 20 to contact the external terminals (not shown) of the card 70. The contacts 12 curve upward and protrude past the main surface 18. An opening 22 is formed adjacent to the openings 20, and a cutout 16 is formed on a base end 4 of the housing 2. Tines 12a of the contacts 12 protrude through the cutout 16 and through the opening 22 and away from the cutout 16. The tines 12a are surface mounted to a circuit board (not shown).

As shown in FIG. 1, a pair of outwardly facing shafts 14 projects from the base end 4 of the housing 2 in a direction perpendicular to an insertion direction 3 of the card 70. As shown in FIG. 3, the shafts 14 are integrally formed with the housing 2 and project outward toward the sides of the housing 2. An end of the cover 6 has a pair of shaft receiving portions 5 that correspond to the shafts 14 and receive the shafts 14. The shaft receiving portions 5 are rotatably mounted on the shafts 14 by engagement. The shafts 14 act as a pivot point for the cover 6.

A curved cutout 7 is provided at a free end portion 8 of the cover 6 for insertion of a finger therethrough when the card 70 is to be removed. The free end portion 8 is configured so that it is fixed by a lock bar or lock member 10 that engages with an engagement protrusion 9 when the cover 6 is rotated to the closed position.

As shown in FIG. 3, a support portion 26 is formed at an end 24 opposite the base end 4 that slidably supports the lock bar 10. The support portion 26 has a pair of horizontally separated rails 28 formed as blocks. Grooves 32 are formed on each of the rails 28. The grooves 32 extend rearward to stop portions 34 and are open to the sides. A recess 44 (most clearly seen in FIG. 4) extends along a bottom surface of the lock bar 10 and opens downward and to the rear. The recess 44 houses a pair of first plate springs 30. The first plate springs 30 project from interior sides of the rails 28 to face each other. A front end portion of the first plate springs 30 is bent slightly forward and in the insertion direction 3 of the card 70. Each first plate spring 30 has a tip 30a. The first plate springs 30 have L-shaped attachment ends 52 (most clearly seen in FIG. 4). The attachment ends 52 are press-fit within a pair of L-shaped grooves 50 (most clearly seen in FIG. 4) formed in bottom surfaces of the rails 28. Because the first plate springs 30 extend along a rear surface 70a of the card 70, the region occupied by the lock bar 10 may be made small.

As shown in FIGS. 1 and 3, the lock bar 10 is a rod shaped member formed of a resin. The lock bar 10 extends between the rails 28 and has a pair of guide grooves 36 that receives the rails 28. The shape of the guide grooves 36 corresponds to the cross-sectional form of the rails 28. The lock bar 10 is configured so that the lock bar 10 is slidably guided by the rails 28 in the insertion direction 3 of the card 70. A card pressing portion 38 is provided at the card insertion opening 40 of the cover 6. The card pressing portion 38 faces an end of the card 70 and is positioned between the guide grooves 36. A finger placing portion 60 is formed on an upper part of the pressing portion 38 of the lock bar 10. A plurality of grooves or steps 60a is formed on the finger placing portion 60 to prevent slipping. A pair of cam surfaces 42 facing the card insertion opening 40 is formed at both ends of the lock bar 10. The cam surfaces 42 cam engage with the engagement protrusions 9 of the cover 6 to slide the lock bar 10.

As shown in FIG. 3, a second plate spring 54 is mounted at an end 11 of the cover 6 by press-fitting or the like. A tip 54a of the second plate spring 54 is bent toward an interior of the cover 6 so that the second plate spring 54 presses a distal end of the inserted card 70 to urge the card 70 backward. Because no force is applied to the card 70 in the insertion direction 3, the card 70 protrudes slightly from the card insertion opening 40 to facilitate removal thereof by a finger that co-operates with the cutout 7.

The spring rate of each of the first plate springs 30 and the second plate spring 54 are set so that the ratio of the spring rate of the second plate spring 54 to the first plate spring 30 is approximately 3:40. Because the spring rate of each of the first plate springs 30 is far greater than the spring rate of the second plate spring 54, when the cover 6 is locked in the closed position, the card 70 is pressed in the insertion direction 3 by the lock bar 10 so that the card 70 is in a predetermined position. Although the spring rate ratio is illustrated by an approximate numeric value, the ratio of the spring rates is not limited to this numerical value. As long as each of the plate release springs 30 has a larger spring rate with respect to the second plate spring 54, any value may be employed.

As shown in FIG. 3, the housing 2 has a cover ejection spring 62 that engages the cover 6. The cover ejection spring 62 has a first end fixed to the housing 2 and a free end 62a in a vicinity of the base end 4 of the housing 2. The free end 62a is inclined upward and abuts an interior surface of the cover 6 in a vicinity of the end 11 so that when the cover 6 is in a closed position, the cover 6 is urged upward. When the engagement between the cover 6 and the lock bar 10 is released, the cover ejection spring 62 pushes the cover 6 to an upward position.

The locking operation of the cover 6 will now be described in greater detail with reference to FIG. 5. Shown in FIG. 5A, the cover 6 is in an open position and is biased upward by the cover ejection spring 62. A card 70 is inserted into the insertion opening 40 of the cover 6 in the insertion direction 3. The card 70 is inserted until the card 70 rests against the second plate spring 54. The lock bar 10 is urged forward by tips 30a of the first plate springs 30 pressing a rear surface 46 (most clearly seen in FIG. 4) of the lock bar 10 in the insertion direction 3 such that an abutment surface 48 of the lock bar 10 abuts the stop portions 34 of the rails. The cover 6 is rotated about the shafts 14 and toward the housing 2 toward the closed position. The engagement protrusions 9 of the cover 6 contact the cam surfaces 42 of the lock bar 10, which is being urged in the insertion direction 3 by the first plate springs 30.

Figure 4:
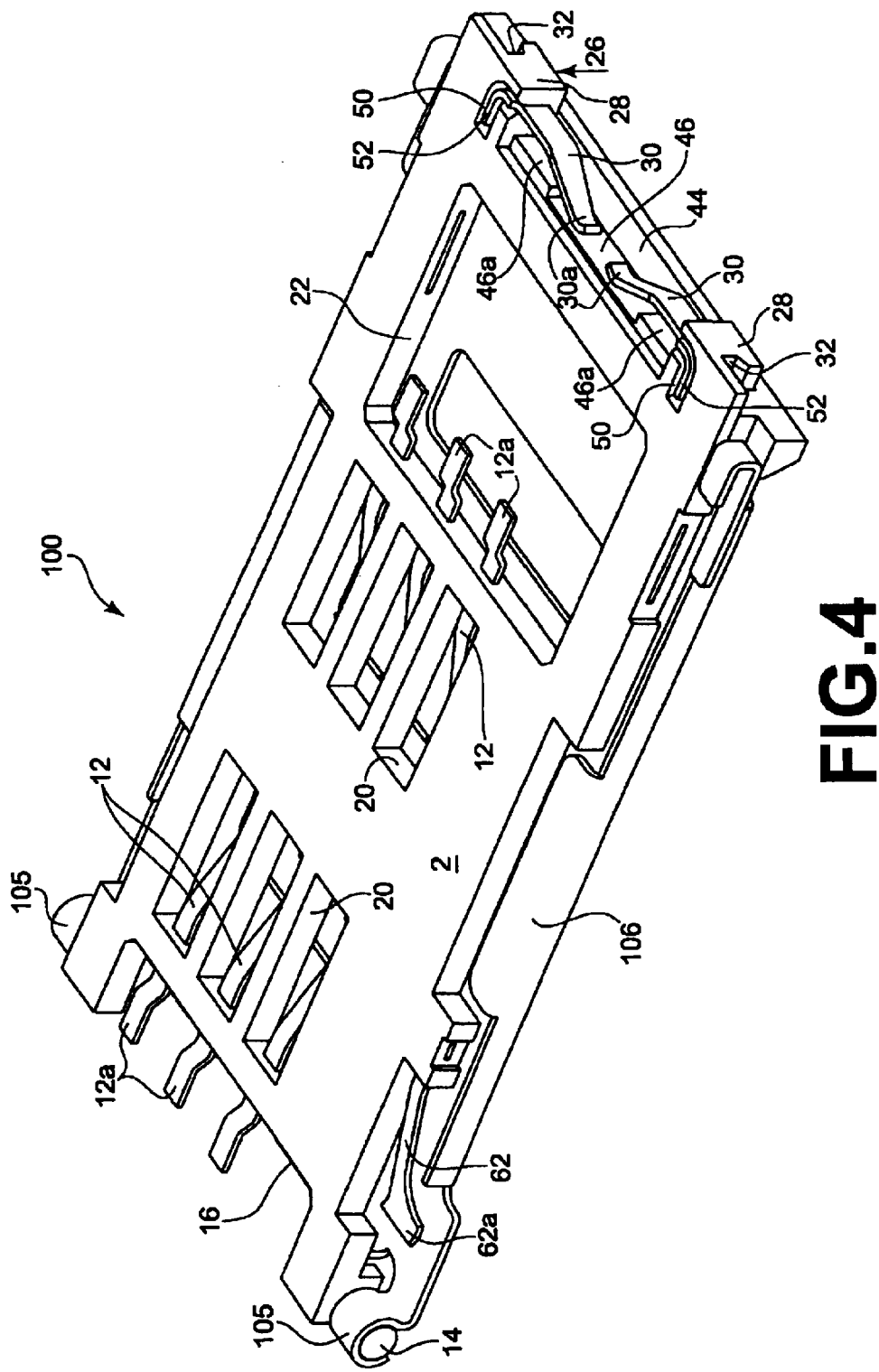
FIG. 4 is a perspective view of a bottom of the connector of FIG. 2.
Figure 5A:
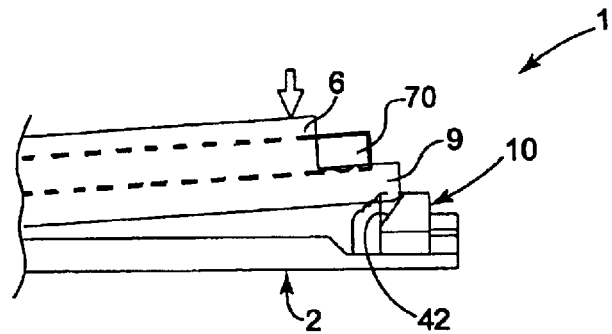
FIG. 5A shows a state in which the cover is in contact with a lock bar.
Figure 5B:
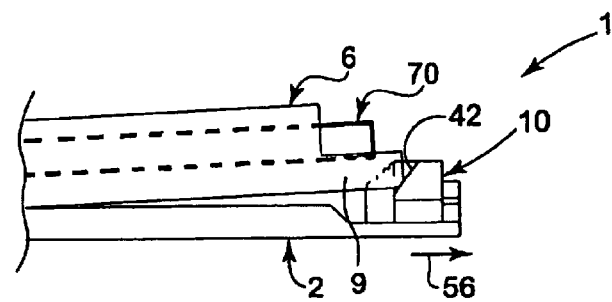
FIG. 5B shows the state in which the cover and the lock bar are in cam engagement.
Figure 5C:
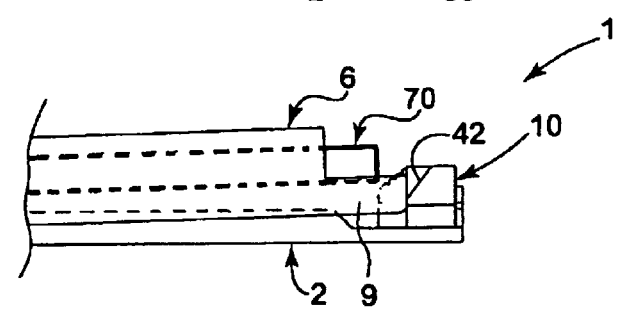
FIG. 5C shows the state in which the cover is being pressed further downward after cam engaging with the lock bar.

As shown in FIG. 5B, when the cover 6 is pressed further downward, the engagement protrusions 9 cam engage with the cam surfaces 42 to force the lock bar 10 to move backward, in the direction indicated by arrow 56, against the force of the first plate springs 30. As the lock bar 10 moves backward, protrusions 46a (most clearly seen in FIG. 4) on the rear surface 46 of the lock bar 10 abut the first plate springs 30 to restrict movement. As shown in FIG. 5C, as the cover 6 is continued to be pressed downward, the engagement protrusions 9 disengage from the cam surfaces 42 and press the lower ends of the cam surfaces 42 to move the lock bar 10 to a rearmost position.

Figure 5D:
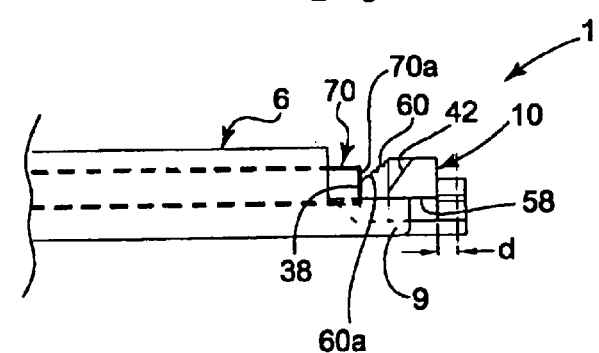
FIG. 5D shows the state in which the cover is completely engaged by the lock bar and a card is pressed by the lock bar.

As shown in FIG. 5D, when the cover 6 is pressed still further downward, the engagement protrusions 9 pass under the lower ends of the cam surfaces 42 and under an engagement surface 58 of the lock bar 10. The lock bar 10 is pushed forward by the first plate springs 30 in the insertion direction. The pressing portion 38 of the lock bar 10 presses the rear surface or end 70a of the card 70 against the force of the second plate spring 54 to move the card 70 slightly, thereby locking the cover 6 and pushing the card 70 further into the cover 6. The amount of movement d is approximately 0.5 mm. This movement causes the external terminals (not shown) of the card 70 and the contacts 12 to wipe against each other. The wiping removes any contaminants or dirt from the contact points on the external contacts (not shown) and/or the contacts 12 to expose a clean metallic surface for an optimal electrical connection.

To remove the card 70 from the connector 1, a finger is placed on the finger placing portion 60 that is formed on the upper part of the pressing portion 38 of the lock bar 10. The lock bar 10 is slid in the direction opposite the insertion direction 3 of the card 70 to release the engagement between the lock bar 10 and the engagement protrusions 9 of the cover 6. When the cover 6 is unlocked, the cover ejection spring 62 forces the cover 6 upward. At the same time, the card 70 is pushed out from the card insertion opening 40 by the second plate spring 54 to facilitate removal of the card 70.

Figure 2:
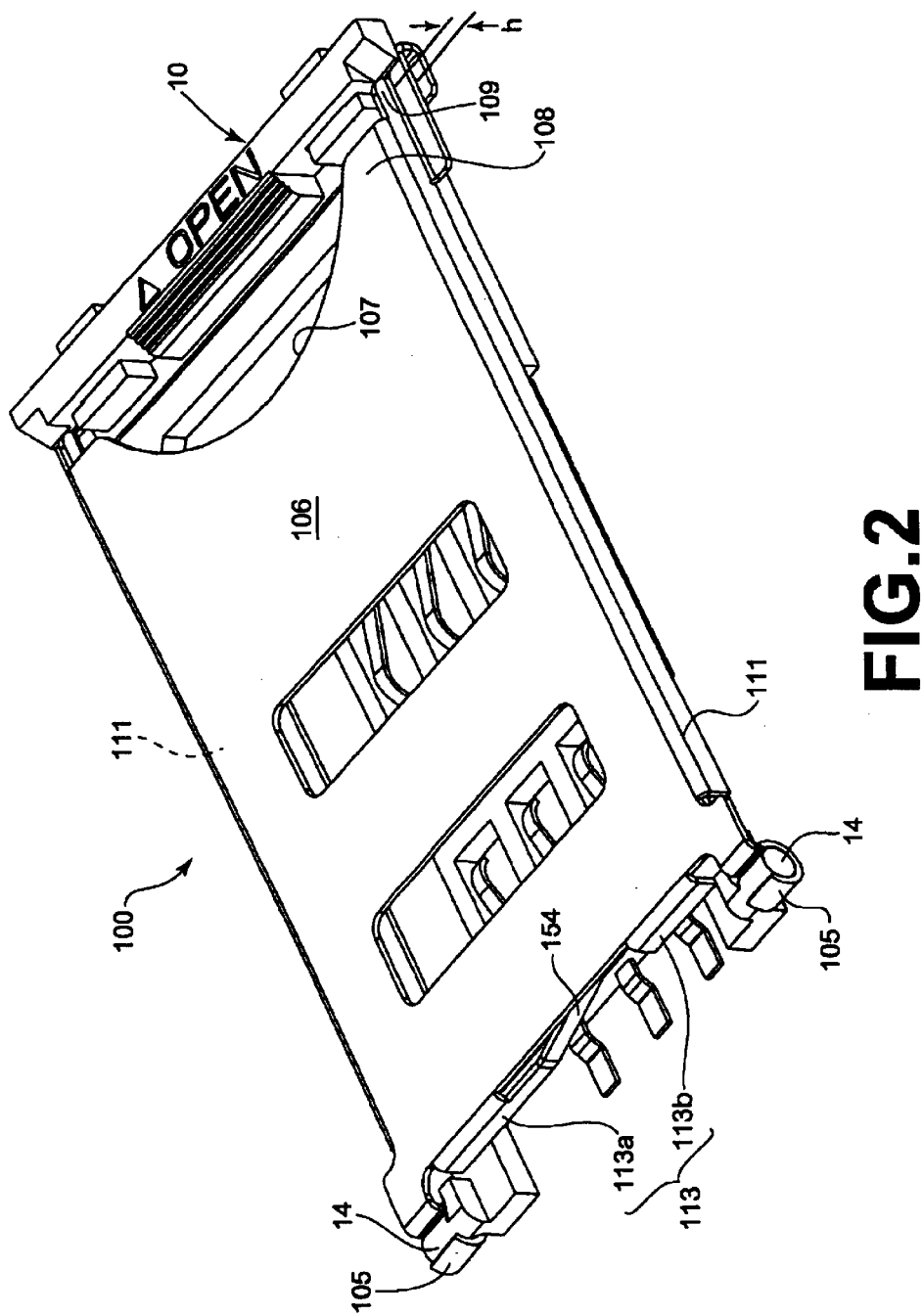
FIG. 2 is a perspective view of a connector according to a second embodiment of the present invention.

FIGS. 2 and 4 show a second embodiment of a card connector 100 according to the present invention. The second embodiment of the card connector 100 is substantially similar to the first embodiment of the card connector 1. Parts similar to the first embodiment will not be described with reference to the second embodiment and like parts will be designated by like reference numerals.

As shown in FIGS. 2 and 4, the connector 100 has a cover 106. The cover 106 is formed from a metal plate and has a cutout 107. Shaft receiving portions 105 for receiving the shafts 14 of the housing 2 are formed at an end portion of the cover 106 by punching and bending the metal plate. Both lateral edges of the cover 106 are bent downward to form side walls 111 that cover lateral edges of the housing 2. At an end of the cover 106 on the side of the shaft receiving portions 105A, a pair of downwardly projecting tongue pieces 113 (113a, 113b) are formed by bending. The tongue pieces 113 act as stoppers if the card 70 is excessively inserted into the housing 2. A second plate spring 154 is integrally formed with the tongue piece 113a and inclines toward the interior of the cover 106. The second plate spring 154 abuts a distal end of the card 70 when the card 70 is inserted into the housing 2 and slightly pushes the card 70 back out of the housing 2.

Engagement protrusions 109 extend outward from a side of a free end portion 108 of the side walls 111. The engagement protrusions 109 are bent in a U-shape and extend beneath the lock bar 10. The engagement protrusions 109 have a height h, which is the same height as the engagement protrusions 9 of the connector 1 so that the engagement protrusions 109 are engaged by the lock bar 10 to lock the cover 106 to the housing 2.

The card connector 100 of the second embodiment operates in a substantially similar manner as the card connector 1, wherein after the engagement protrusions 9 pass under the lower ends of the cam surfaces 42 and under an engagement surface 58 of the lock bar 10, the lock bar 10 is pushed forward by the first plate springs 30 in the insertion direction. The pressing portion 38 of the lock bar 10 presses the rear surface or end 70a of the card 70 against the force of the second plate spring 54 to move the card 70 slightly, thereby locking the cover 6 and pushing the card 70 further into the cover 6. This movement causes the external terminals (not shown) of the card 70 and the contacts 12 to wipe against each other. The wiping removes any contaminants or dirt from the contact points on the external contacts (not shown) and/or the contacts 12 to expose a clean metallic surface for an optimal electrical connection.

The foregoing illustrates some of the possibilities for practicing the invention. Many other embodiments are possible within the scope and spirit of the invention. For example, the lock bar 10 may be rotatably mounted to the cover 6 instead of being slidable. In this case, a similar wiping effect may be obtained by pressing the card 70 when the cover 6 is locked. In addition, the first and second plate springs 30, 54 may alternatively be coil springs or torsion springs. It is, therefore, intended that the foregoing description be regarded as illustrative rather than limiting, and that the scope of the invention is given by the appended claims together with their full range of equivalents.

I claim:

1. A card connector, comprising:
   a housing having contacts;
   a cover having a card insertion slot that receives a card, said card having a contact portion corresponding to said contacts of said housing;
   a locking member that locks said cover to said housing; and
   a first spring that urges said locking member toward said card so said locking member engages an end of said card and pushes said card adjacent to said contacts so that said contact portion slides across said contacts of said housing and is electrically connected thereto.

2. The card connector of claim 1, wherein the lock member is slideably mounted on the housing.

3. The card connector of claim 1, further comprising a cover ejection spring that pushes said cover to an upward position for removal of said card.

4. The card connector of claim 1, further comprising tongue pieces that engage said card when said card is over-inserted into said connector.

5. The card connector of claim 1, wherein the cover is formed from a metal plate.

6. The card connector of claim 1, further comprising a second spring that urges said card in a direction toward said locking member.

7. The card connector of claim 6, wherein said first spring has a higher spring rate than said second spring.

8. The card connector of claim 7, wherein said spring rate of said second spring to said first spring is approximately 3:40.

9. A card connector, comprising:
   a housing having contacts;
   a cover mounted to said housing and having a card insertion slot that receives a card, said card having a contact portion corresponding to said contacts of said housing;
   a locking member that locks said cover to said housing, said locking member slideably mounted on said housing and having a cam surface and a pressing portion; and
   a first spring that urges said locking member toward said card so said pressing portion engages an end of said card and pushes said card adjacent to said contacts so that said contact portion slides across said contacts of said housing to wipe contaminants from a surface of said contact portion and said contacts to improve an electrical connection therebetween.

10. The card connector of claim 9, wherein said first spring is a plate spring.

11. The card connector of claim 9, wherein said locking member is mounted to a rail formed on said housing and said first spring is press-fit to said rail.

12. The card connector of claim 9, further comprising a second spring that urges said card in a direction toward said locking member, said second spring having a lower spring rate than said first spring.

13. The card connector of claim 9, further comprising tongue pieces that engage said card when said card is over-inserted into said connector.

14. The card connector of claim 9, wherein the cover is formed from a metal plate.

15. The card connector of claim 12, wherein said spring rate of said second spring to said first spring is approximately 3:40.

16. The card connector of claim 9, further comprising a cover ejection spring that pushes said cover to an upward position for removal of said card.

* * * * *